UNITED STATES PATENT OFFICE.

WILLIAM F. NILES, OF JERSEY CITY, NEW JERSEY.

IMPROVEMENT IN THE MANUFACTURE OF ORNAMENTAL BUTTONS FROM BLOOD AND OTHER MATERIALS.

Specification forming part of Letters Patent No. 217,705, dated July 22, 1879; Reissue No. 8,887, dated September 9, 1879; application filed August 11, 1879.

*To all whom it may concern:*

Be it known that I, WILLIAM F. NILES, of Jersey City, county of Hudson, and State of New Jersey, have invented certain new and useful Improvements in the Manufacture of Ornamental Buttons; and I do hereby declare that the following is a full, clear, and exact description of the same.

Blood is first taken prepared in the same manner as described in the Letters Patent No. 193,846, dated August 7, A. D. 1877, granted to W. L. Palmer, as assignee, by mesne assignments, of J. Bliss and T. O. Badger; and by my improvements in the process then patented buttons can be made of a unique and ornamental character. Horn or hoof is taken and ground or pulverized in any suitable manner. I then take the fine powder so produced and mix it with some adhesive substance in solution, such as gelatine or albumen. I then mix in dry colors with such substance until a paste is formed, from which thin sheets are made, which are spread out on racks or other suitable receptacles to dry, and after they have been sufficiently dried they are broken up or reduced to small pieces, and such small pieces are then sprinkled into the button-dies before being filled, for the purpose of insuring the spots or mottling upon the face of the button, as the facing of the button in a manner attractive to the eye is an important point.

After the mottling or facing material has thus been sprinkled or placed in the empty button-dies the dies are filled with powdered blood, and the buttons completed by pressure and heat, in the manner set forth in said patent.

By making blood buttons by the mode or process above described their faces can be rendered highly ornamental and attractive, and that, too, without leaving any cracks or fissures between the spots or mottlings and the material forming the body of the button, there being a perfect union or combination between the powdered blood and the pieces of mottling or facing substance, while at the same time the spots or mottling on the faces of the buttons are distinct and marked, and their outlines are sharp and perfect, thus distinguishing the button at a glance from buttons manufactured previous to my invention.

What I claim as new and of my invention, and desire to secure by Letters Patent, is—

The novel composition or compound herein described for making ornamental buttons, consisting of powdered blood and colored lumped powdered hoof or horn and a gelatine or albumen substance, the whole being prepared and combined together substantially as and for the purposes set forth.

WILLIAM F. NILES.

Witnesses:

I. STUART SMITH,

T. Q. GILSON.